(12) United States Patent
Vaccari et al.

(10) Patent No.: US 10,919,236 B2
(45) Date of Patent: Feb. 16, 2021

(54) PROCESS AND SYSTEM FOR THE MANUFACTURE OF WINDOWS/DOORS

(71) Applicant: Graf Synergy S.r.l., Nonantola (IT)

(72) Inventors: Andrea Vaccari, Nonantola (IT); Gilberto Verrini, Nonantola (IT)

(73) Assignee: Graf Synergy S.r.l., Nonantola (IT)

(*) Notice: Subject to any disclaimer, the term of this patent is extended or adjusted under 35 U.S.C. 154(b) by 202 days.

(21) Appl. No.: 15/768,863

(22) PCT Filed: Oct. 25, 2016

(86) PCT No.: PCT/IB2016/056414
§ 371 (c)(1),
(2) Date: Apr. 17, 2018

(87) PCT Pub. No.: WO2017/072660
PCT Pub. Date: May 4, 2017

(65) Prior Publication Data
US 2019/0054705 A1 Feb. 21, 2019

(30) Foreign Application Priority Data
Oct. 27, 2015 (IT) .............................. UB2015A5075

(51) Int. Cl.
*B29C 65/00* (2006.01)
*B29C 65/20* (2006.01)
(Continued)

(52) U.S. Cl.
CPC ...... *B29C 66/52431* (2013.01); *B29C 65/203* (2013.01); *B29C 65/2061* (2013.01);
(Continued)

(58) Field of Classification Search
CPC ............ B29C 66/52431; B29C 65/203; B29C 66/81431; B29C 66/73921; B29C 66/322;
(Continued)

(56) References Cited

U.S. PATENT DOCUMENTS 3,604,483 A * 9/1971 Nissen ................. B27M 3/0066
144/3.1
3,789,564 A * 2/1974 Kessler ................. E06B 3/5454
52/127.5

(Continued)

FOREIGN PATENT DOCUMENTS

DE          3039733 A1 *  5/1982  ....... B29C 66/73921
DE     102007060976        7/2009
(Continued)

OTHER PUBLICATIONS

International Preliminary Report on Patentability dated May 1, 2018 From the International Bureau of WIPO Re: Application No. PCT/IB2016/056414. (13 Pages).
(Continued)

*Primary Examiner* — Michael N Orlando
*Assistant Examiner* — Christopher W Raimund

(57) ABSTRACT

The process for the manufacture of windows/doors (1), characterized by the fact that it comprises the following steps:
 providing at least one inner panel (2) for windows/doors;
 providing a plurality of plastic profiled elements (3) for windows/doors, each of the profiled elements (3) comprising at least two areas to seal (5), coupleable to the areas to seal (5) of the other profiled elements (3), and at least one longitudinal slot (6), in which a respective perimeter side (4) of the inner panel (2) is insertable;
 performing a step of mechanical machining by chip removal on at least one of the areas to seal (5);
 heating the areas to seal (5);
 coupling the heated areas to seal (5) to one another by pressing the profiled elements (3) one against the other to maintain the areas to seal (5) in mutual contact and define the frame for windows/doors, the coupling taking place with the inner panel (2) inserted in the
(Continued)

longitudinal slots (6) to define a window/door (1) which is composed by the frame and by the inner panel (2) contained in the frame.

12 Claims, 11 Drawing Sheets

(51) Int. Cl.
 *E06B 3/54* (2006.01)
 *E06B 3/96* (2006.01)
 *B29L 31/00* (2006.01)

(52) U.S. Cl.
 CPC .... *B29C 66/02245* (2013.01); *B29C 66/1162* (2013.01); *B29C 66/322* (2013.01); *B29C 66/72523* (2013.01); *B29C 66/73921* (2013.01); *B29C 66/81431* (2013.01); *B29C 66/843* (2013.01); *E06B 3/5454* (2013.01); *E06B 3/9608* (2013.01); *B29C 66/71* (2013.01); *B29L 2031/003* (2013.01); *B29L 2031/005* (2013.01); *B29L 2031/724* (2013.01); *B29L 2031/778* (2013.01)

(58) Field of Classification Search
 CPC .......... B29C 66/02245; B29C 65/2061; B29C 66/1162; B29C 66/72523; B29C 66/843; B29C 66/71; E06B 3/5454; E06B 3/9608; B29L 2031/003; B29L 2031/778; B29L 2031/005; B29L 2031/724
 See application file for complete search history.

(56) References Cited

U.S. PATENT DOCUMENTS

| | | | |
|---|---|---|---|
| 5,814,181 A * | 9/1998 | Richter | ............... B29C 65/2092 |
| | | | 156/351 |
| 6,167,662 B1 | 1/2001 | Gruber | |
| 2007/0032972 A1* | 2/2007 | Glover | ............. B29C 66/73921 |
| | | | 702/77 |
| 2010/0071834 A1* | 3/2010 | Vetter | ................ B29C 66/1162 |
| | | | 156/73.5 |

FOREIGN PATENT DOCUMENTS

| | | | | |
|---|---|---|---|---|
| FR | 2546221 A1 * | 11/1984 | ....... | B29C 66/72523 |
| GB | 2376657 | 12/2002 | | |
| WO | WO 2005/042901 | 5/2005 | | |
| WO | WO-2013132406 A1 * | 9/2013 | ....... | B29C 66/81427 |

OTHER PUBLICATIONS

International Search Report and the Written Opinion dated Feb. 1, 2017 From the International Searching Authority Re. Application No. PCT/IB2016/056414. (17 Pages).

Office Action dated Oct. 9, 2019 from the China National Intellectual Administration Re. Application No. 201680062533.x with an English Summary. (8 pages).

Search Report dated Jan. 20, 2020 from the Russian Patent Office Re. Application No. 2018109540. (11 pages).

\* cited by examiner

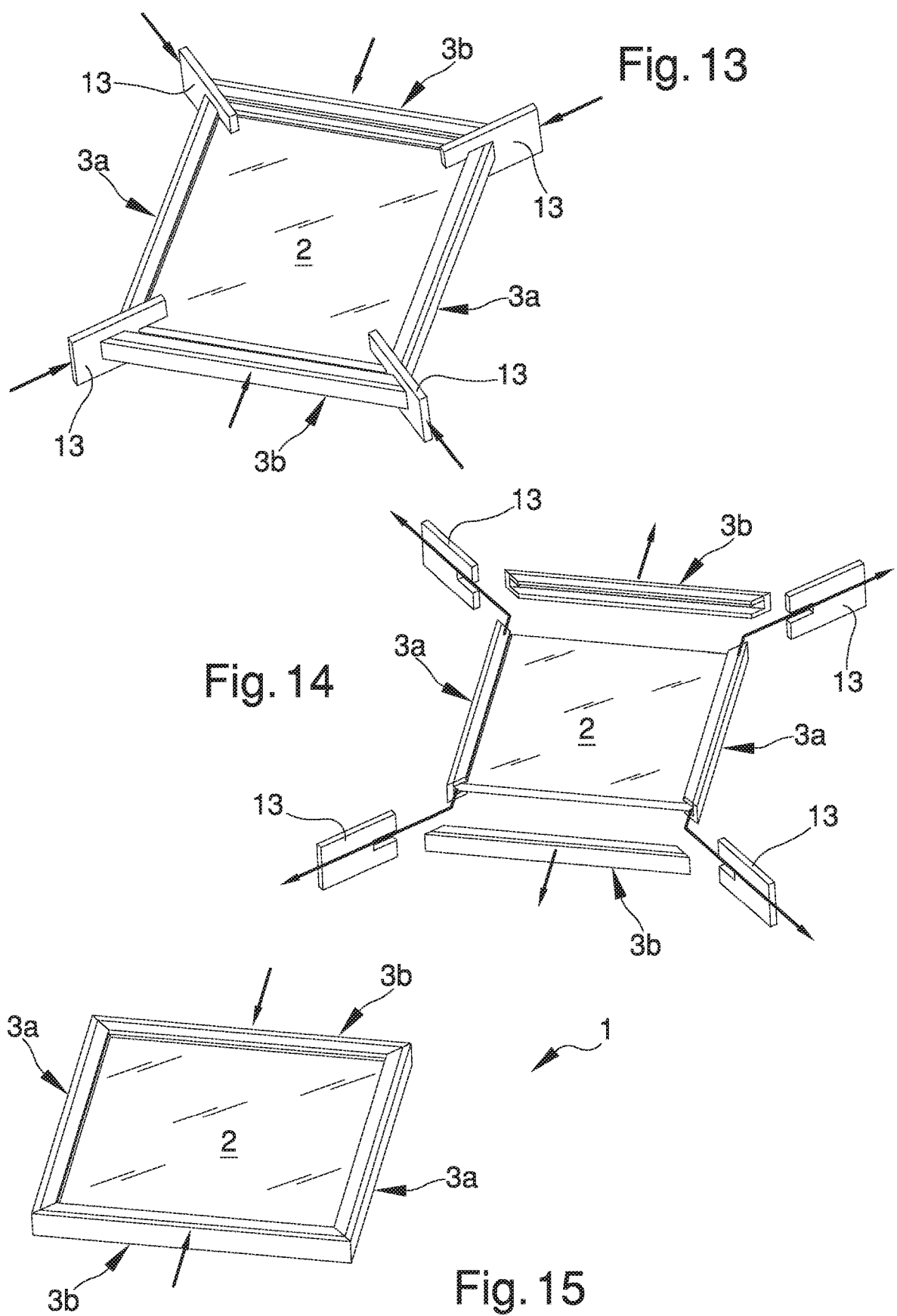

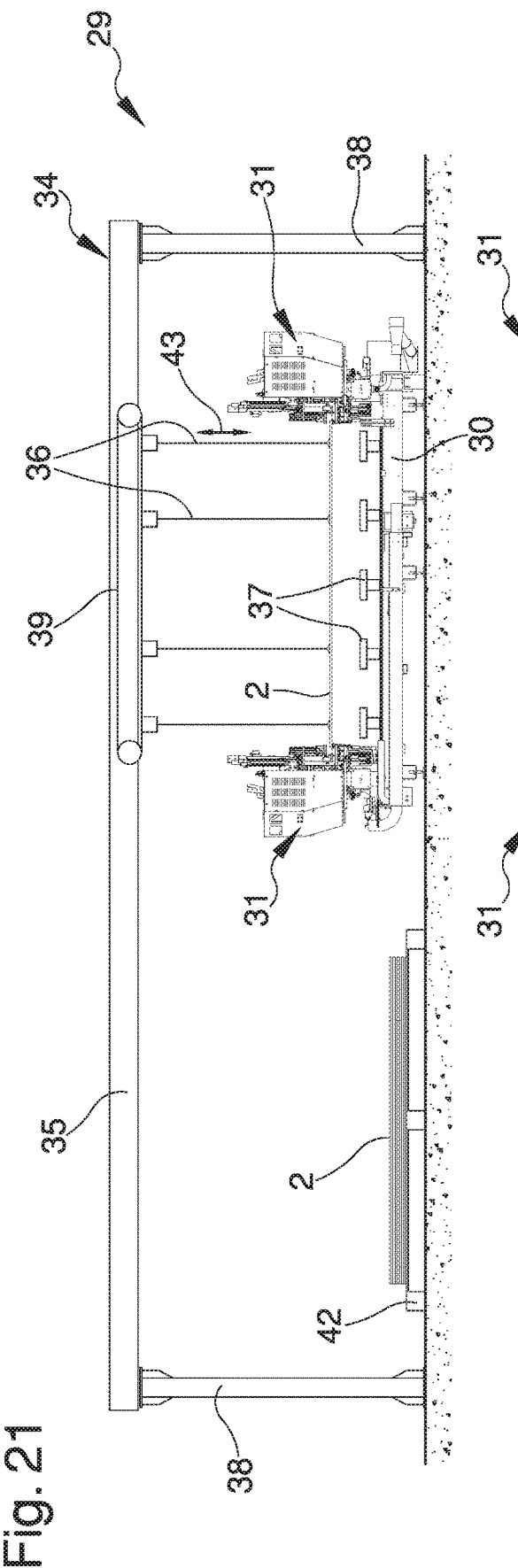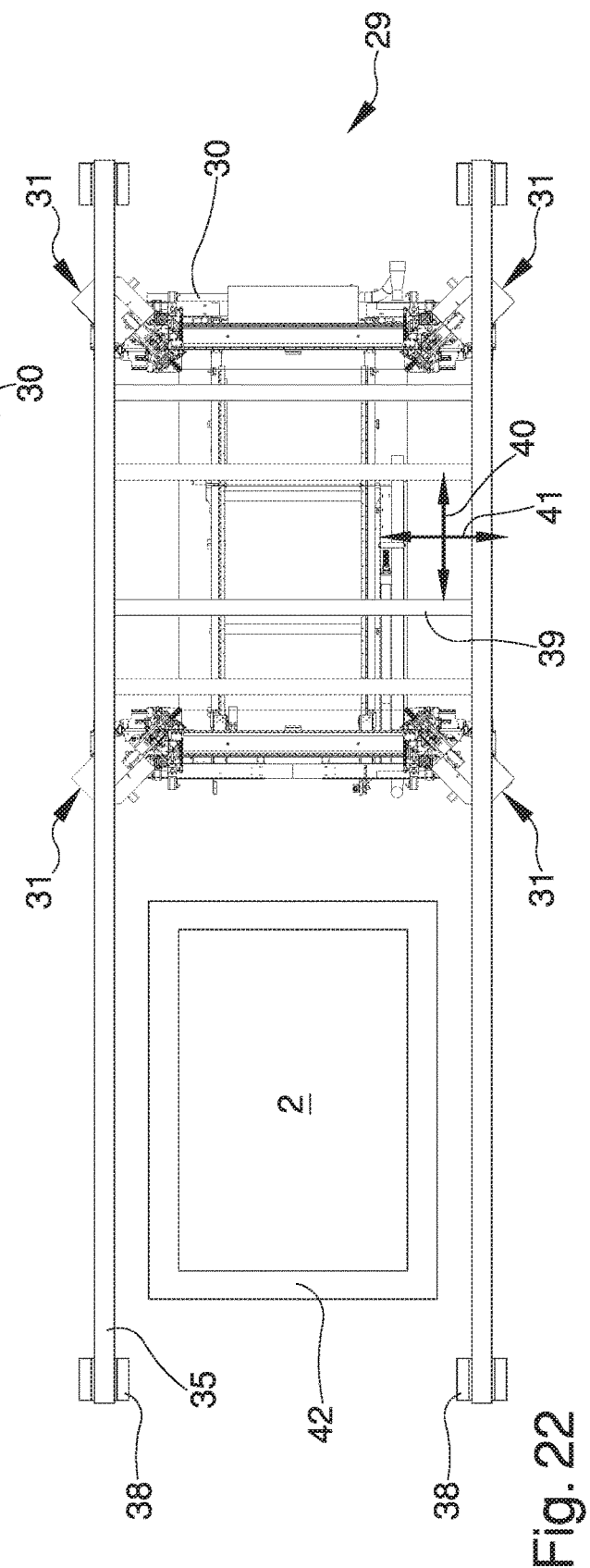

though much time is melted with the consequent formation of an
PROCESS AND SYSTEM FOR THE MANUFACTURE OF WINDOWS/DOORS

RELATED APPLICATIONS

This application is a National Phase of PCT Patent Application No. PCT/IB2016/056414 having International filing date of Oct. 25, 2016, which claims the benefit of priority of Italian Patent Application No. UB2015A005075 filed on Oct. 27, 2015. The contents of the above applications are all incorporated by reference as if fully set forth herein in their entirety.

FIELD AND BACKGROUND OF THE INVENTION

The present invention relates to a process and a system for the manufacture of windows/doors.

In the ambit of the present document by window/door is meant a structure intended to close an opening (window, door, wing etc.) made in an outer or inner wall, in the floor or in the roof of a building.

The structure may be either mobile (e.g. the wing of a window) or fixed (that is firmly secured to the wall).

The windows/doors usually consist in an outer frame, made of materials such as aluminum, plastic or other, and in an inner panel, made of glass, plexiglass or other material (either transparent or non-transparent).

With specific reference to the field of windows/doors with frames made of plastic, it is emphasized that these frames are manufactured by sealing together a plurality of corresponding profiled elements, preferably made of PVC or other heat-sealable plastic materials.

The sealing of the profiled elements takes place by means of melting of respective head surfaces which is obtained by heating the portions to be connected by means of suitable plates with heating elements, and then by pressing the heated portions the one against the other until their mutual union.

Generally, the heated portions are the head ending parts of the profiled elements, suitably cut at 45° to define, e.g., a right-angled portion of the frame.

This methodology is implemented by sealing machines with respective retention members of the profiled elements, movable in mutual approach to bring the heated ending parts to seal in mutual contact.

Other machines are also equipped with finishing systems, able to remove the bead or sealing bead that is formed during melting of the two profiled elements.

In fact, at the line of union of the two profiled elements (surfaces cut at 45°), the excess portion of molten material flows out and forms a bead protruding from the visible surface of the profiled elements.

For this reason, in order to give the finished window/door an appreciable aesthetic appearance, the profiled elements, once sealed, undergo a process for the removal of the bead.

The known sealing devices and briefly described above, however, have important drawbacks, mainly related to the formation of the aforementioned sealing bead.

It should in fact be considered that the sealing area of the plastic profiled elements is not entirely homogeneous, and therefore, to make the profiled elements regular, much material is melted with the consequent formation of an abundant bead, and then plenty of scrap material which must be removed.

Furthermore, the finishing processes, suitable for the removal of the bead and the cleaning of the sealing area, significantly affect the overall timing of the window/door processing.

It should be noticed, in fact, that for any sealing of the window/door the profiled elements must be subsequently machined.

Furthermore, for the radiused profiled elements the removal of said bead is considerably complicated.

To this is added that the machinery used for the abovementioned finishing operations turn out to be bulky, complex and particularly expensive.

This entails the need to bear additional costs and processing times also given the presence of additional bulky equipment and tools.

The patent document WO 2013/132406 A1 shows a method and a device which allow obviating the above drawbacks.

The system shown in WO 2013/132406 A1, in fact, is equipped with two mobile retention members on which the profiled elements are mounted and allows to seal them without forming any sealing bead, thanks to a prior operation of milling of the areas to seal, adapted to form on the profiled elements a containing compartment for the sealing bead, and to the application of containment pressers, which are juxtaposed to the heated profiled elements during sealing and prevent the leakage of the molten material from the containing compartment.

Some improved sealing methodologies are shown in patent documents WO 2014/122572 A1 and IT 102015000033340.

Once the profiled elements have been sealed together, the frame of the window/door is obtained which is then completed by means of the application of the inner panel, as is schematically illustrated in FIGS. 1 and 2.

The inner panel A is manually entered by an operator inside the frame B previously sealed (FIG. 1).

Subsequently (FIG. 2), the operator locks the inner panel A with retaining edges or glazing beads C, which are coupled to the profiled elements D1, D2 of the frame B and pressed against the inner panel A.

During the fixing of the glazing beads C, the operator also places a seal E between the inner panel A and the glazing beads C.

After completing this job, the glazing beads C are an integral part of the window/frame and the seals E are pressed on the inner panel A to ensure the seal thereof.

The profiled elements D1, D2 of the frame B usually have a cross section of rather complex shape but in which a central portion D1 is always recognizable, intended to laterally surround the inner panel A, and a protruding portion D2, against which the inner panel A rests; in the solution shown in FIGS. 1 and 2, for example, the cross section of the profiled elements D1, D2 is substantially L-shaped, in which the central portion D1 and the protruding portion D2 are orthogonal to each other.

The glazing beads C are associated with the central portion D1 on the side opposite to the protruding portion D2, so as to enclose in a sandwich-like manner the inner panel A.

The application operation of the inner panel A to the frame B, commonly called "glazing", entails nevertheless considerable drawbacks.

First of all, this operation is not very practical and easy and must be carried out manually by specialized personnel.

Added to this is the fact that, to carry out the glazing job, large spaces inside the manufacturing plant of the doors and windows are inconveniently occupied, which could be used otherwise.

The costs for the execution of the glazing operation are therefore very high, not only in terms of labor but also in terms of plant management costs, which inevitably leads to an increase of the sales price of the windows/doors, with the risk of making the products less attractive to customers.

SUMMARY OF THE INVENTION

The main aim of the present invention is to provide a process and a system for the manufacture of windows and doors that allow obtaining a production system with superior performance and significantly lower costs.

A further object of the present invention is to make available a process and a system which greatly simplify the entire manufacturing process of windows and doors.

Not the latest object of the present invention is to provide a process and a system for the manufacture of windows and doors that allow obtaining a position of marked advantage over competitors.

Another object of the present invention is to provide a process and a system for the manufacture of windows and doors that allow to overcome the mentioned drawbacks of the prior art within the ambit of a simple, rational, easy and effective to use as well as affordable solution.

The above mentioned objects are achieved by the present process for the manufacture of doors and windows having the characteristics of claim 1.

BRIEF DESCRIPTION OF THE SEVERAL VIEWS OF THE DRAWINGS

Other characteristics and advantages of the present invention will appear better evident from the description of some preferred, but not exclusive, embodiments of a process and of a system for the manufacture of windows and doors, illustrated by way of an indicative but non-limiting example in the accompanying drawings, in which:

FIGS. 11, 12, 13, 14 and 15 show, in a succession of axonometric, schematic and partial views a further embodiment of the process according to the invention;

FIG. 21 is a side view of the system according to the invention;

FIG. 22 is a plan view of the system according to the invention;

DESCRIPTION OF SPECIFIC EMBODIMENTS OF THE INVENTION

Figure 1:
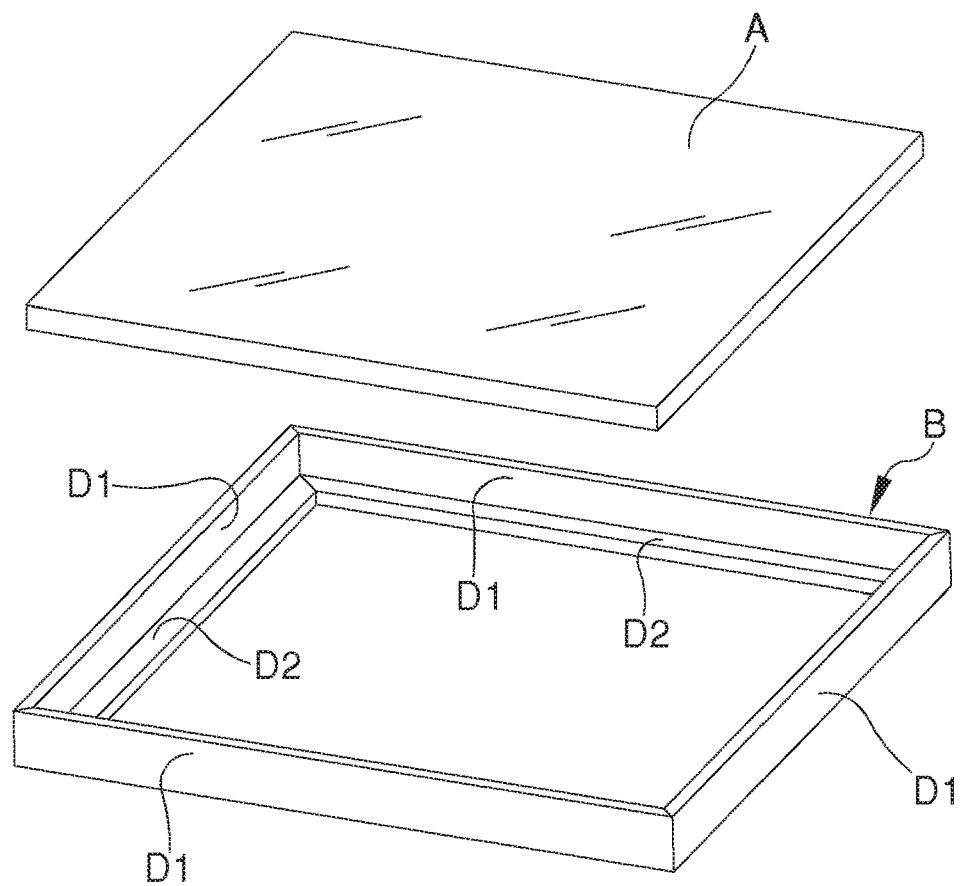
FIGS. 1 and 2 show, in a succession of axonometric, schematic and partial views a process for the manufacture of windows and doors of known type.
Figure 2:
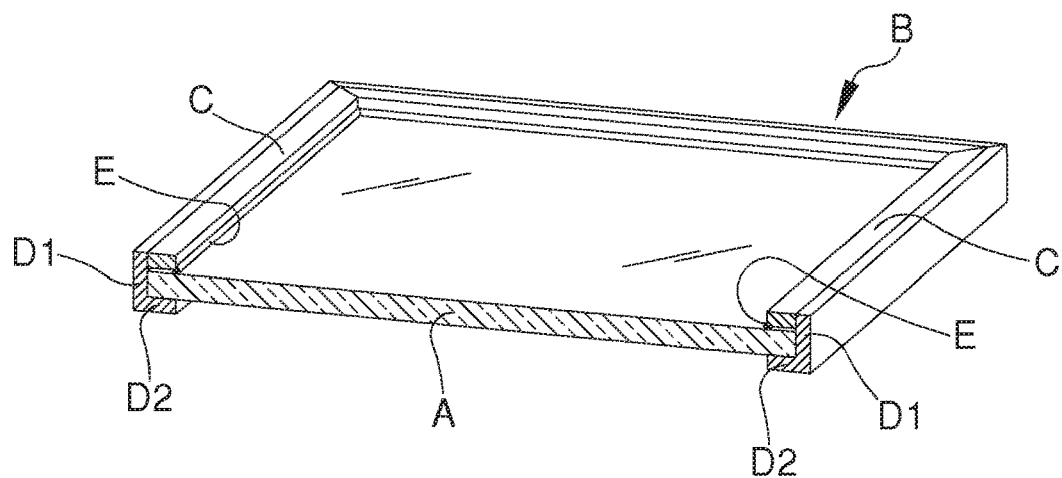

With particular reference to such figures, globally indicated with 1 is a window/door obtained by the union of at least one inner panel 2 for windows/doors and a plurality of plastic profiled elements 3 for windows/doors.

The inner panel 2 is advantageously made of glass (single or multilayer) but it cannot be ruled out that it can be made of plexiglass or other material, either of a transparent or of a non-transparent type.

The inner panel 2 has a plurality of perimeter sides 4.

Preferably, the inner panel 2 has a substantially rectangular shape and the perimeter sides 4 are four and arranged at 90° to each other; alternative embodiments cannot however be ruled out in which the inner panel 2 is shaped differently (e.g. in a triangle, pentagon, hexagon, and the like).

The profiled elements 3 are made, e.g., of PVC, but also plastic materials of the heat-sealable type different to PVC cannot be ruled out.

Given that the inner panel 2 is rectangular, then the profiled elements 3 are four in number, one for each perimeter side 4; it is easy to understand, however, that in the case of inner triangular panels 2 three profiled elements 3 will be employed, in the case of inner pentagonal panels 2 five profiled elements 3 will be employed, and so on.

Each of the profiled elements 3 comprises at least two areas to seal 5, coupleable to the areas to seal 5 of the other profiled elements 3 to define a frame for windows and doors.

To allow the union by sealing, the areas to seal 5 of the profiled elements 3 are cut at 45° so as to define a coupling between two consecutive right-angled profiled elements 3.

Each of the profiled elements 3, furthermore, comprises at least one longitudinal slot 6 in which a respective perimeter side 4 of the inner panel 2 is insertable.

The profiled elements 3, in fact, comprise at least a first longitudinal portion 7, a second longitudinal portion 8 and a third longitudinal portion 9 mutually arranged substantially in a C pattern, with the first longitudinal portion 7 and the second longitudinal portion 8 which extend from the third longitudinal portion 9 and define the longitudinal slot 6 between them.

In the ambit of the present document, by the term "longitudinal direction" of the profiled elements 3 is meant the direction of their length; given that such profiled elements 3 are usually made by extrusion of the plastic material, then the longitudinal direction coincides with the direction of extrusion.

The first longitudinal portion 7, the second longitudinal portion 8 and the third longitudinal portion 9 may be formed in a single monolithic body, i.e. may be extruded through a shaped matrix that directly imparts the C shape to the profiled elements 3.

Alternatively, it is possible to make the longitudinal profiled elements 7, 8, 9 separately from each other and assembling them later; the second longitudinal portion 8 and the third longitudinal portion 9, e.g., can be extruded together to form a single monolithic body substantially L-shaped, while the first longitudinal portion 7 is extruded separately and is associated with (e.g. by interlocking) the third longitudinal portion 9 after extrusion.

In any case, the process and the system according to the invention provide for the use of profiled elements 3 in which, prior to being sealed, the longitudinal portions 7, 8, 9 are arranged substantially in a C and define the longitudinal slot 6; this is a very important difference compared to traditional techniques, in which, on the contrary, the profiled elements are shaped in a L and a glazing bead is applied only after sealing.

The distance between the first longitudinal portion 7 and the second longitudinal portion 8 is set depending on the thickness of the inner panel 2; the insertion of the inner panel 2 in the longitudinal slots 6 takes place substantially snugly, as will be better described in the following pages.

The process according to the invention comprises the following steps:
providing the inner panel 2;
providing the plurality of profiled elements 3;
performing a step of mechanical machining by chip removal on at least one of the areas to seal 5;
heating the areas to seal 5;
coupling the heated areas to seal 5 to one another by pressing the profiled elements 3 one against the other to maintain the areas to seal 5 in mutual contact and define the frame for windows/doors, the step of coupling taking place with the inner panel 2 inserted in the longitudinal slots 6 to define the window/door 1 which is composed by the frame of the profiled elements 3 and by the inner panel 2 contained in the frame of the profiled elements 3.

To perform the coupling between the inner panel 2 and the profiled elements 3, the process according to the invention comprises the steps of:
placing the inner panel 2 in an insertion configuration in which it is substantially coplanar to the lying plane 10 of the longitudinal slots 6, with the perimeter sides 4 which are arranged facing the longitudinal slots 6; and
moving the profiled elements 3 from a position of mutual spacing away to a position of mutual approach that is adapted to insert the inner panel 2 in the longitudinal slots 6.

The step of coupling the profiled elements 3 takes place substantially by pressing all the profiled elements at the same time one against the other.

In other words, during coupling, all the areas to seal 5 of the profiled elements 3 are mutually pressed together, with the inner panel 2 positioned in the insertion configuration and all four corners of the frame of the profiled elements 3 which are joined at 90° at the same time.

The step of performing a mechanical machining by chip removal is carried out before the step of heating, e.g. by means of suitable removal means 44.

The removal means 44 are e.g. milling cutters.

Conveniently, the step of performing a mechanical machining by chip removal comprises the step of forming a groove 11 (visible in FIG. 3) at at least one of the areas to seal 5 of the profiled elements 3, the step of coupling the areas to seal 5 comprising a sub-step of melting the areas to seal 5 between them to define a sealing bead and a sub-step of making a containing compartment defined by the groove 11, in which the sealing bead is made inside the containing compartment.

The step of forming the groove 11 is preferably implemented by means of an operation by chip removal on a peripheral edge of at least one of the profiled elements 3.

Conveniently, the groove 11 is practicable on the profiled elements 3 in a way similar to what is taught by the patent documents WO 2013/132406 A1, WO 2014/122572 A1 and IT 102015000033340.

The removal means 44, in addition or alternatively to making the groove 11, can advantageously also leveling, entirely or in part, the areas to seal 5.

In the presence of the groove 11, for example, the removal means 44 can level the parts of the areas to seal 5 not occupied by the groove itself.

In this case, the removal means 44 can be made to pass on the substantial totality of the areas to seal 5 at different working depths:
at the edges of the areas to seal 5, the working depth of the removal means 44 is greater and such as to define the groove 11;
at the remaining parts of the areas to seal 5, on the other hand, the working depth of the removal means 44 is less and such as to remove only a small layer of plastic material sufficient to flatten and level the areas to seal 5.

In other words, the removal means 44 are used not only to shape the groove 11 but they are absolutely essential to level the walls and correct any cutting errors.

The groove 11 can also be practiced on all the longitudinal portions 7, 8, 9 of the profiled elements 3, or only on some of them.

In a possible embodiment of the invention, e.g., the groove 11 is practiced only on the second longitudinal portion 8 and on the third longitudinal portion 9, while the first longitudinal portion 7 is completely leveled at the same working depth corresponding to the working depth of the groove 11.

This way, the profiled elements 3 are intended to be sealed together by melting and mutual union of the second longitudinal portions 8 and of the third longitudinal portions 9, while the first longitudinal portions 7 are not heated and, during the step of coupling, approach substantially snugly without melting.

Advantageously, the step of heating takes place by means of heating means 13 which, e.g., consist of at least a sealing element with heated plate having two faces opposing each other on which two of the areas to seal 5 are placeable in contact.

The sealing element with heated plate 13 consists, e.g., of a heating element having a substantially plate-shaped conformation.

In practice, the areas to seal 5 are heated by approaching the profiled elements 3 from opposite sides and pressing them against the faces of the sealing element with heated plate 13.

Preferably, during the step of heating, a plurality of sealing elements with heated plate 13 are used, one for each corner of the frame of profiled elements 3.

In a particular embodiment shown in FIGS. 3 to 6, the step of heating takes place with the inner panel 2 arranged to the outside of the longitudinal slots 6, between the step of heating and that of coupling elapsing a coupling time of less than 2 seconds during which the inner panel 2 is inserted in the longitudinal slots 6.

Figure 3:
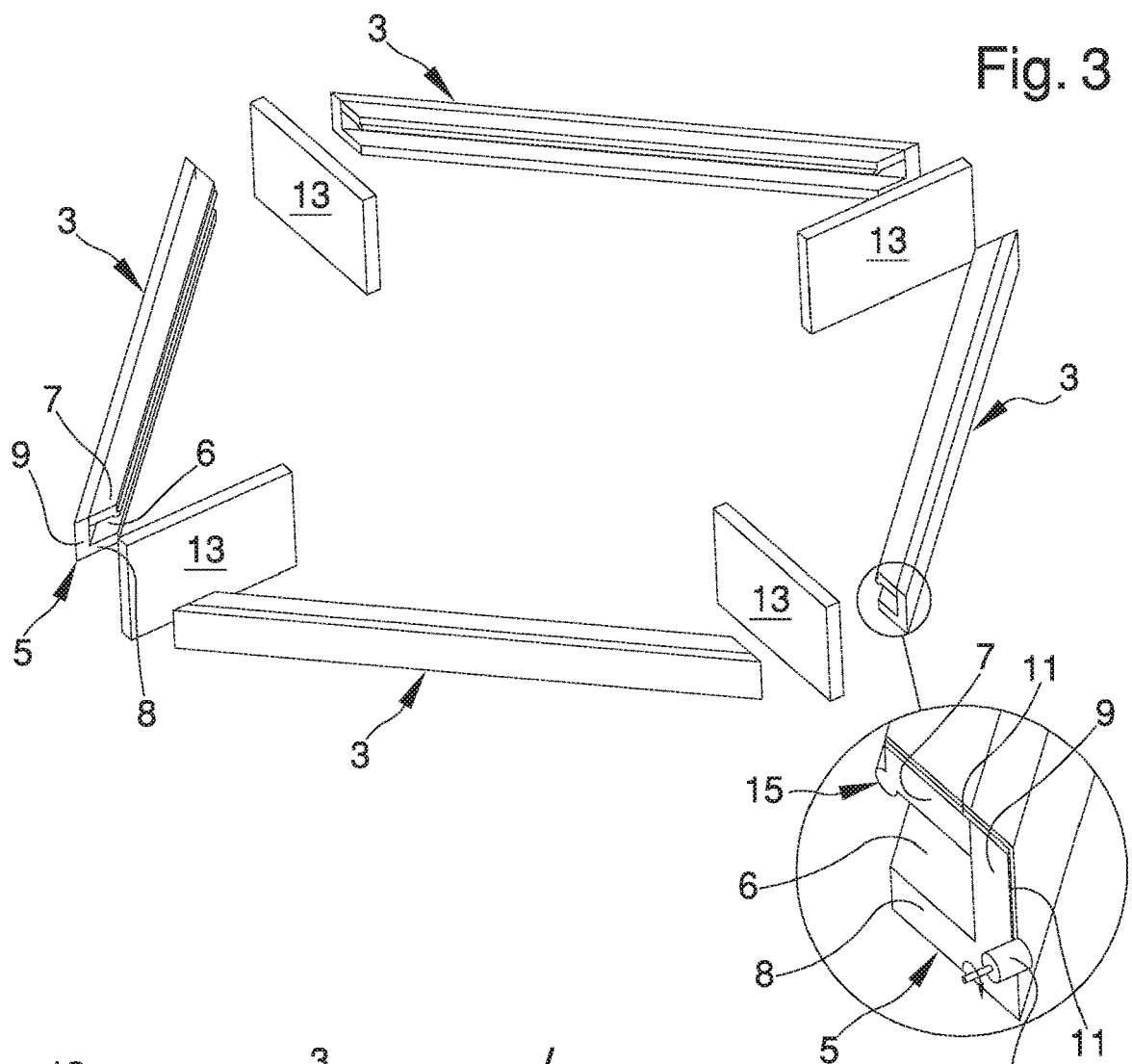
FIGS. 3, 4, 5 and 6 show, in a succession of axonometric, schematic and partial views an embodiment of the process according to the invention.

In this embodiment, the profiled elements 3 are first placed substantially coplanar, with the areas to seal 5 mutually faced two by two and the longitudinal slots 6 directed facing each other two by two, as shown in FIG. 3, while the inner panel 2 is not in the insertion configuration.

The profiled elements 3 are maintained spaced apart from each other and between the areas to seal 5 are placed the sealing elements with heated plate 13, arranged facing and substantially parallel to the corresponding areas to seal 5 and therefore inclined by 45° with respect to the longitudinal directions of the profiled elements 3.

Figure 4:
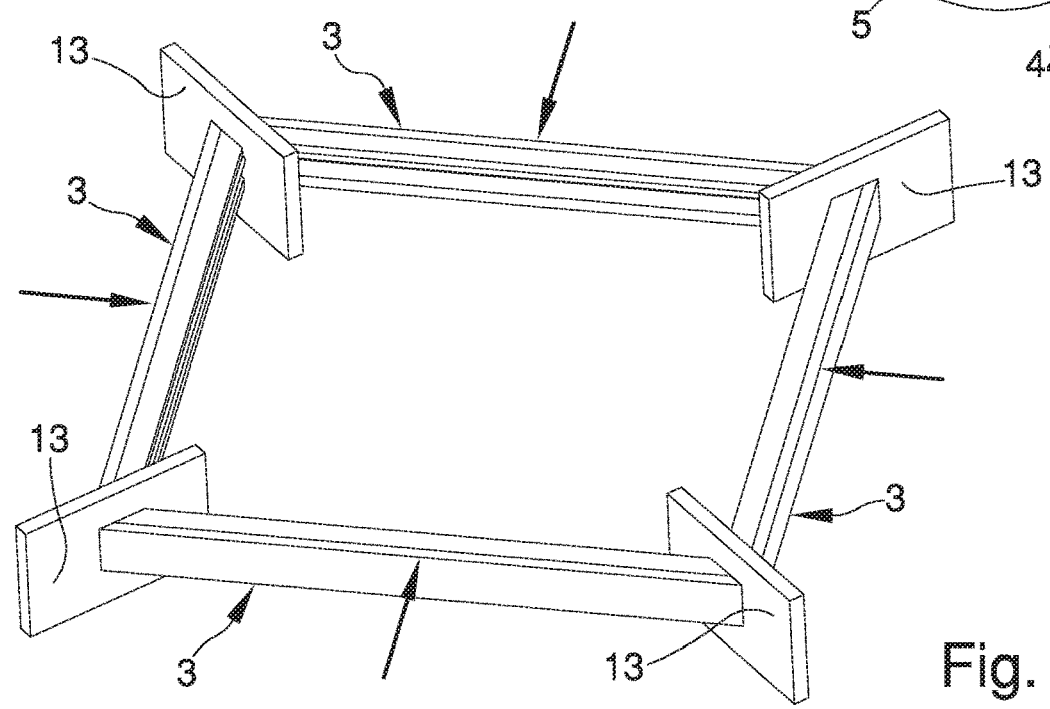

The simultaneous approach of the profiled elements 3 to the sealing elements with heated plate 13 brings the areas to seal 5 in contact with the sealing elements with heated plate 13, for their heating; the movement of the profiled elements 3 occurs along directions orthogonal to the profiled elements themselves (FIG. 4).

Figure 5:
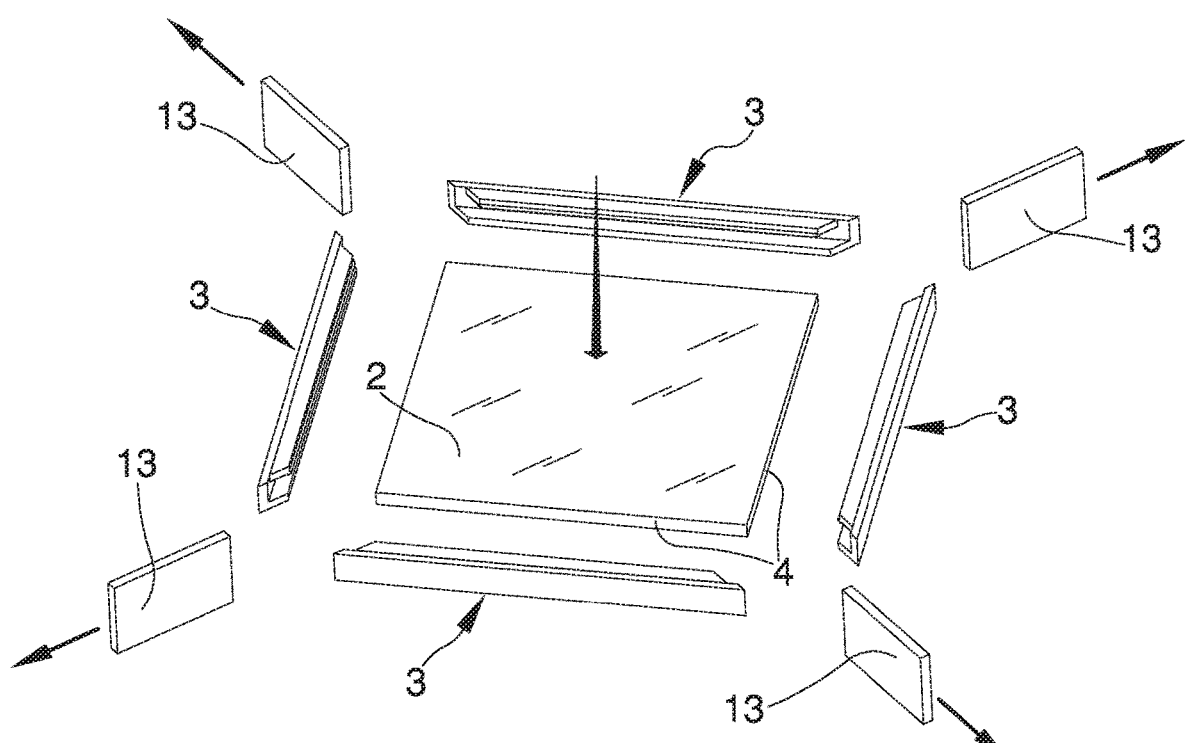

At this point the profiled elements 3 are moved away, the sealing elements with heated plate 13 are removed and the inner panel 2 is placed in the insertion configuration in which it is substantially coplanar to the lying plane 10 of the longitudinal slots 6 (FIG. 5).

Figure 6:
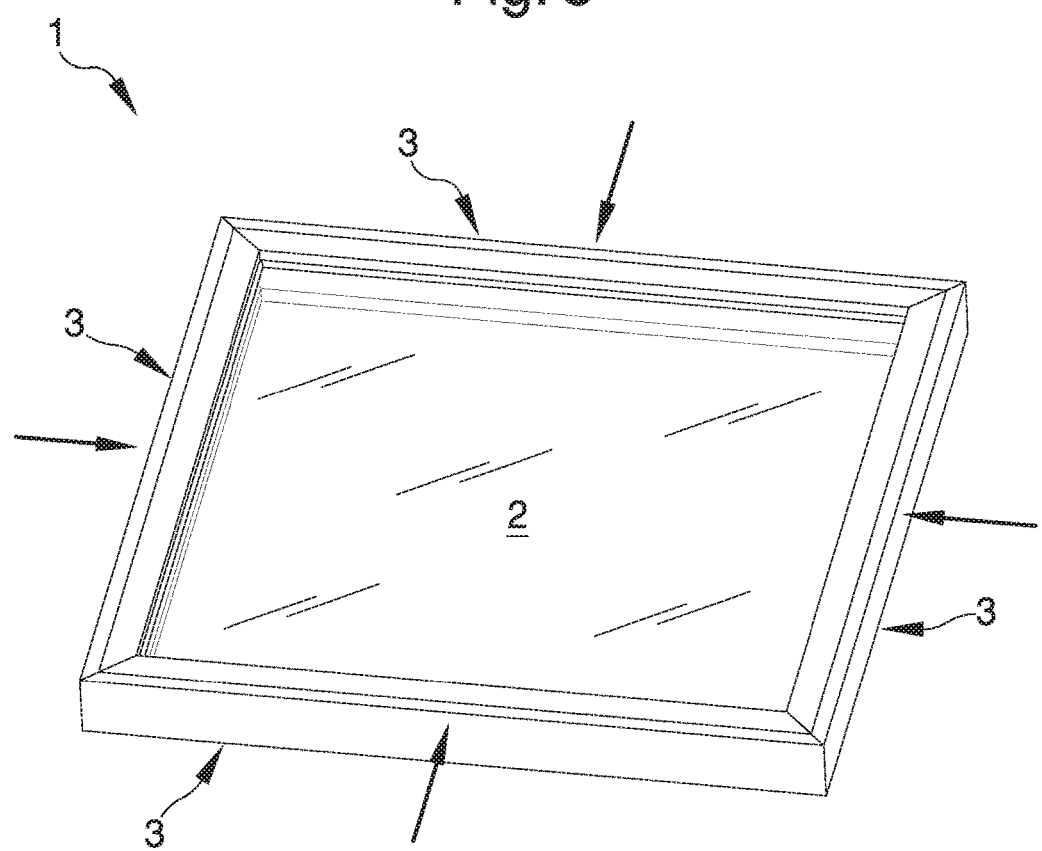

The profiled elements 3, which are located in the position of mutual spacing away, are finally moved to the position of mutual approach; this displacement is adapted, firstly, to insert the inner panel 2 in the longitudinal slots 6 and, ultimately, to juxtapose and press the areas to seal 5 for their coupling (FIG. 6).

The instant when the profiled elements 3 are moved away from the sealing elements with heated plate 13 the step of heating ends, while the instant when the heated areas to seal 5 come in contact, the step of coupling, on the contrary, begins.

It follows that, during the coupling time:
the profiled elements 3 and the sealing elements with heated plate 13 must be moved away;
the inner panel 2 should be placed in the insertion configuration;
the profiled elements 3 must be reapproached to insert the inner panel 2 in the longitudinal slots 6 as far as placing the areas to seal 5 in mutual contact.

Given that the coupling time is less than 2 seconds (but more in detail less than 1 second and preferably equal to about 200 milliseconds), the above operations are performed at high speed to avoid that the heated areas to seal 5 excessively cool before coming in contact, jeopardising the coupling thereof.

To reduce the execution time and the speed of movement of the profiled elements 3, an alternative embodiment shown in FIGS. 7 to 10 provides that, after the step of mechanical machining by chip removal, the step of heating occurs with the inner panel 2 arranged partially inserted inside at least one of the longitudinal slots 6, between the step of heating and that of coupling elapsing a coupling time of less than 2 seconds during which the profiled element 3 corresponding to the at least one of the longitudinal slots 6 moves from a position of partial insertion to a position of fully insertion.

Conveniently, during the step of heating the inner panel 2 is arranged partially inserted inside all the longitudinal slots 6 and, in other words, all the profiled elements 3 are placed simultaneously in the position of partial insertion.

The profiled elements 3 are initially placed in a completely similar manner to the embodiment shown in FIG. 3, that is they are substantially coplanar, with the areas to seal 5 mutually facing two by two and the longitudinal slots 6 directed facing each other two by two; the inner panel 2, on the other hand, unlike what happened in the previous embodiment, is placed in the insertion configuration.

In the embodiment shown in FIGS. 7 to 10, the sealing elements with heated plate 13 comprise at least a recess 14 at least partly complementary to the cross section of the inner panel 2 and placeable so as to embrace at least partly the perimeter sides 4 of the inner panel 2.

Figure 7:
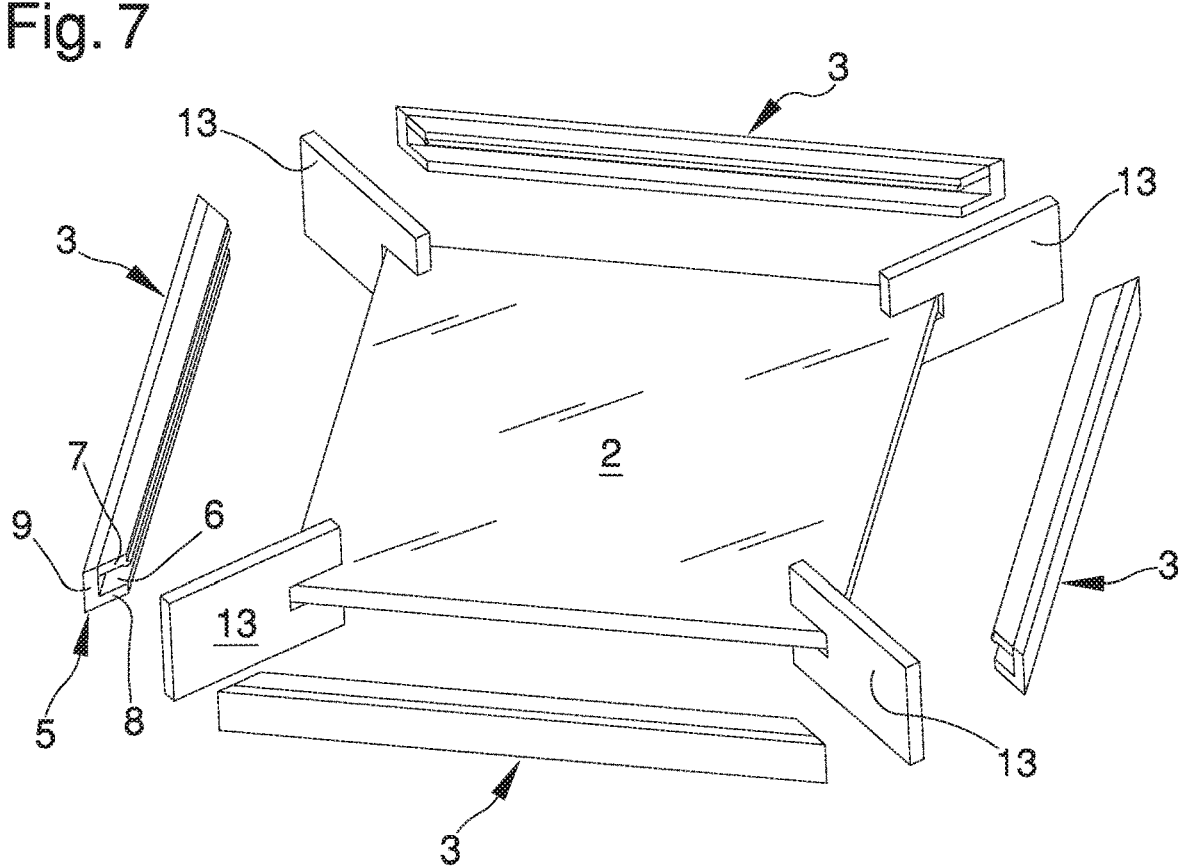
FIGS. 7, 8, 9 and 10 show, in a succession of axonometric, schematic and partial views an alternative embodiment of the process according to the invention.

In the position shown in FIG. 7, all the sealing elements with heated plate 13 are placed so as to embrace partly the perimeter sides 4 of the inner panel 2, and in particular its corners. The profiled elements 3 are maintained spaced apart from each other and between the areas to seal 5 are placed the sealing elements with heated plate 13, arranged facing and substantially parallel to the corresponding areas to seal 5 and therefore inclined by 45° with respect to the longitudinal directions of the profiled elements 3.

Figure 8:
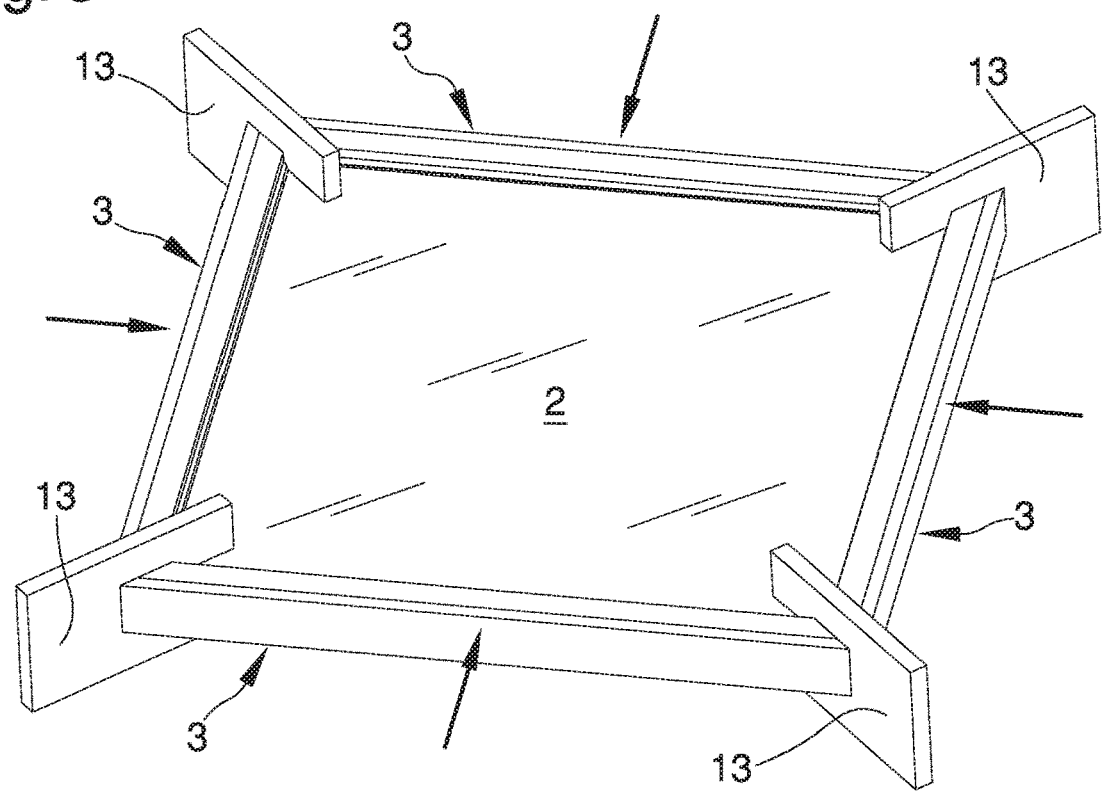

The contemporary approaching of the profiled elements 3 to the sealing elements with heated plate 13 first brings the profiled elements 3 to the position of the partial insertion, in which in practice the perimeter sides 4 of the inner panel 2 are partially inserted in the longitudinal slots 6, and then pushes the areas to seal 5 in contact with the sealing elements with heated plate 13, for their heating; the movement of the profiled elements 3 is carried out also in this case along directions orthogonal to the profiled elements themselves (FIG. 8).

At this point the profiled elements 3 are slightly moved away from the sealing elements with heated plate 13, while remaining fitted around the perimeter sides 4 of the inner panel 2.

Figure 9:
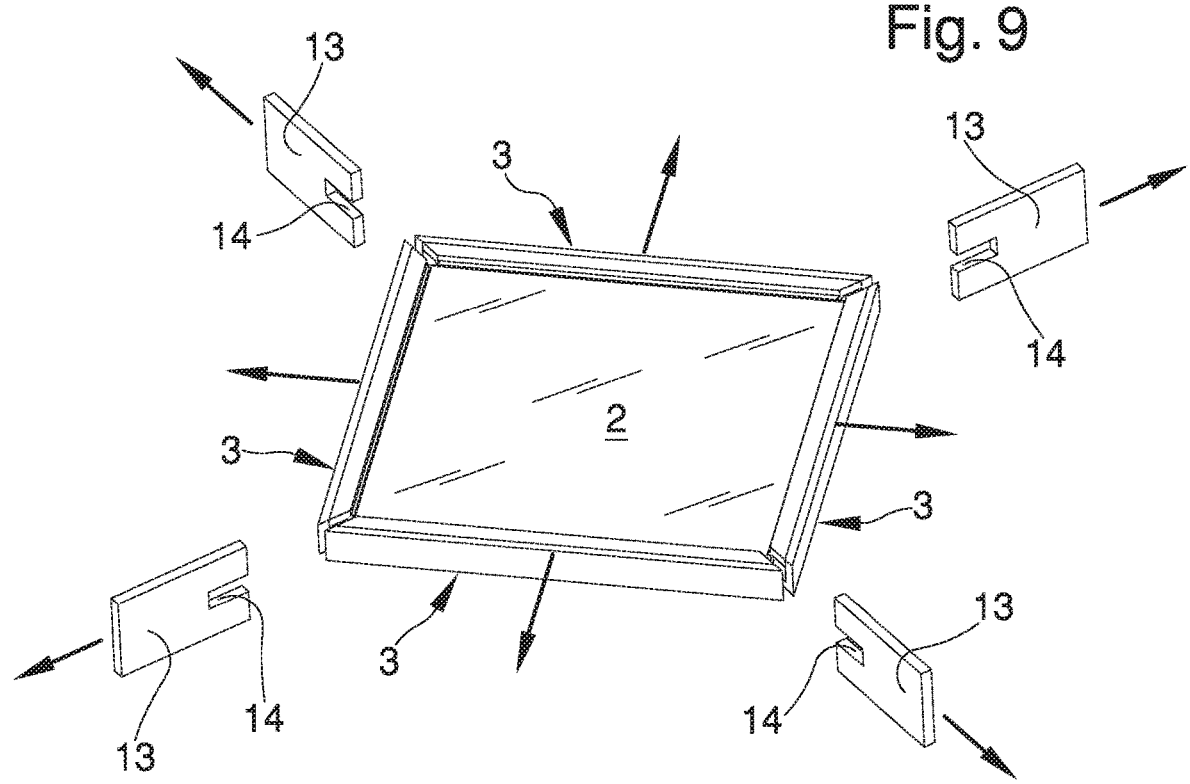

The sealing elements with heated plate 13 are therefore moved away from the profiled elements 3 and from the inner panel 2 by making them slide along directions inclined at 45° with respect to the profiled elements 3 and coplanar to the sealing elements with heated plate 13 (FIG. 9).

Figure 10:
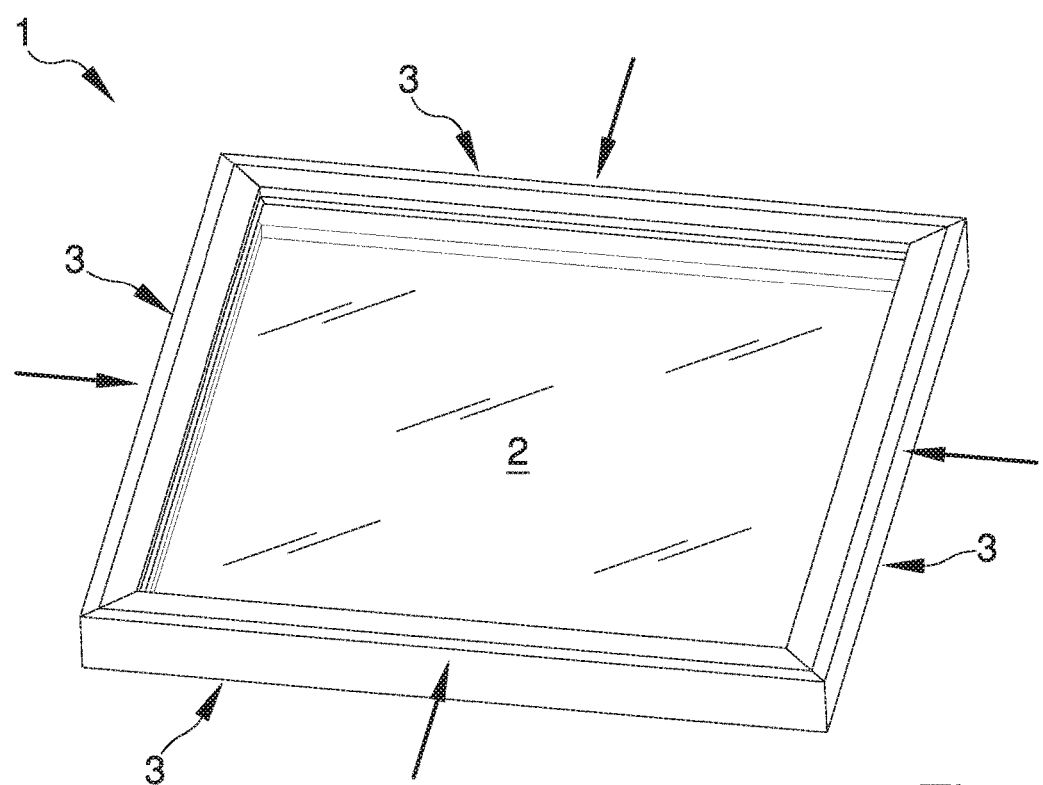

The profiled elements 3, which are still in the position of partial insertion, are finally approached as far as placing them in the position of complete insertion, in which the areas to seal 5 are juxtaposed and are pressed against each other for their coupling (FIG. 10).

The instant when the profiled elements 3 are moved away from the sealing elements with heated plate 13 the step of heating ends, while the instant when the heated areas to seal 5 come in contact, the step of coupling, on the contrary, begins.

It follows that, during the coupling time, the inner panel 2 is already placed in the insertion configuration and the stroke which the profiled elements 3 must travel is significantly shorter than that which the profiled elements 3 shown in FIGS. 3 to 6 must travel.

In a further embodiment shown in FIGS. 11 to 15, instead, after the step of mechanical machining by chip removal it happens that the step of heating takes place with the inner panel 2 arranged completely inserted inside at least one of the longitudinal slots 6, between the step of heating and the step of coupling elapsing a coupling time of less than 2 seconds during which the profiled element corresponding to the at least one of the longitudinal slots 6 remains substantially stationary with respect to the inner panel 2 and, in other words, it remains in a position of complete insertion.

More in detail, in this case the profiled elements are conveniently divided into a pair of first profiled elements 3*a*, located on opposite sides with respect to the inner panel 2, and into a pair of second profiled elements 3*b*, which are also arranged on opposite sides with respect to the inner panel 2; the first profiled elements 3*a* and the second profiled elements 3*b*, when considered without distinction from each other, will be generally indicated by the reference number 3.

During the step of heating the inner panel 2 is completely inserted inside the longitudinal slots 6 of the first profiled elements 3*a* and is partially inserted inside the longitudinal slots 6 of the second profiled elements 3*b*.

In other words, once arranged on the inner panel 2, the first profiled elements 3*a* are immediately placed in the position of complete insertion and are no longer moved; the second profiled elements 3*b*, instead, are placeable first in a position of partial insertion and only subsequently in a position of complete insertion.

The profiled elements 3 are initially placed in a completely similar manner to the embodiment shown in FIG. 7, i.e. they are substantially coplanar, with the areas to seal 5 mutually facing each other two by two and the longitudinal slots 6 directed facing each other two by two, while the inner panel 2 is in the insertion configuration.

Figure 11:
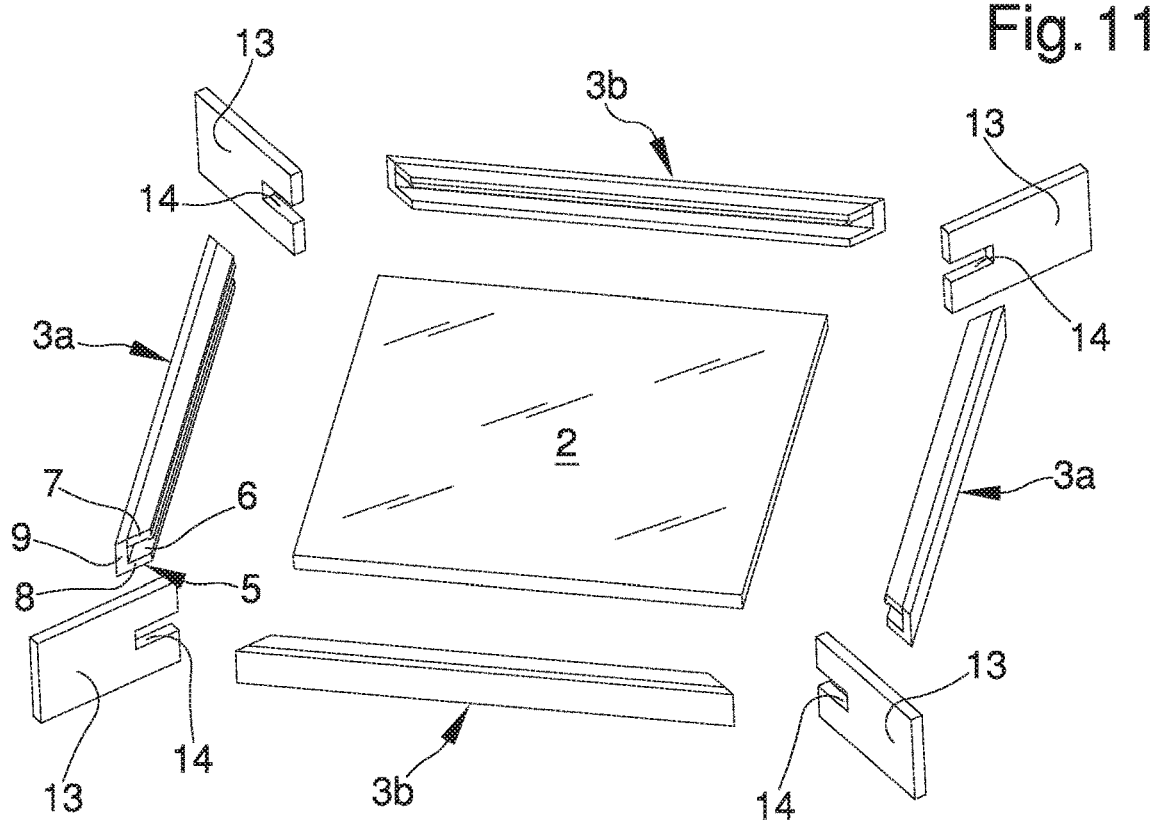

Even in the embodiment shown in FIGS. 11 to 15 the sealing elements with heated plate 13 comprise at least a recess 14 at least partly complementary to the cross section of the inner panel 2 and placeable so as to embrace at least partly the perimeter sides 4 of the inner panel 2; in the starting position shown in FIG. 11, however, all the sealing elements with heated plate 13 are separated and spaced apart with respect to the inner panel 2.

Figure 12:
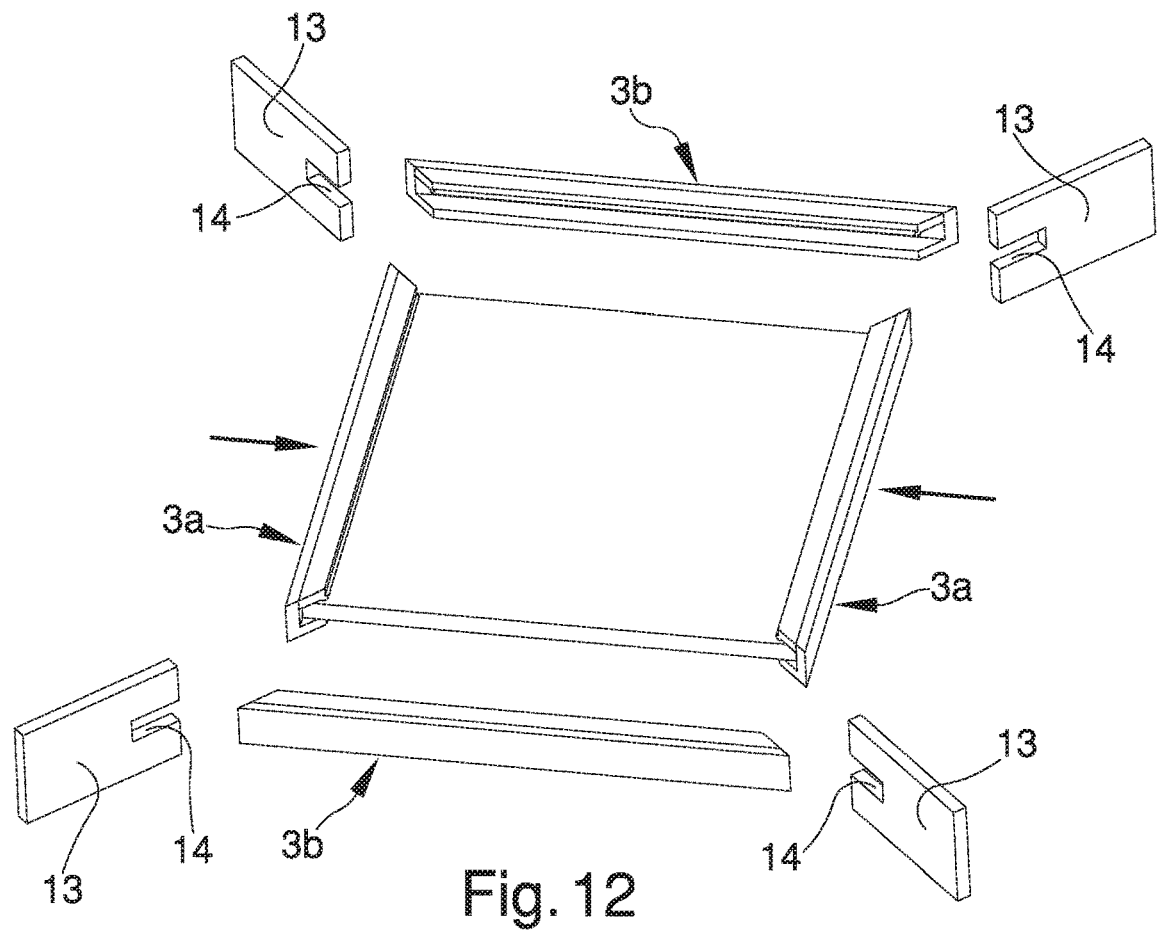

To seal the profiled elements 3 around the inner panel 2, the first profiled elements 3a are first of all mutually approached by moving them along a direction orthogonal to them as far as they reach the position of complete insertion (FIG. 12).

At this point the sealing elements with heated plate 13 are placed against the areas to seal 5 of the first profiled elements 3a and the second profiled elements 3b are approached as far as placing also their areas to seal 5 on the sealing elements with heated plate 13.

The displacement of the second profiled elements 3b takes place along a direction orthogonal to them and is such as to make them fit on the corresponding perimeter sides 4 as far as they reach the position of partial insertion.

The maintenance of the profiled elements 3 against the sealing elements with heated plate 13 allows heating all the areas to seal 5 simultaneously (FIG. 13).

At this point the second profiled elements 3b are moved away from the sealing elements with heated plate 13; depending on how long is the moving away stroke, the second profiled elements 3b can be completely pulled out of the inner panel 2 or remain fitted around the perimeter sides 4 of the inner panel 2.

The sealing elements with heated plate 13 are then moved away from the profiled elements 3 and from the inner panel 2 by making them slide, first of all, along a first direction parallel to the first profiled elements 3a, for their moving away from the first profiled elements 3a, and then along a second direction inclined at 45° with respect to the first profiled elements 3a and coplanar to the sealing elements with heated plate 13 (FIG. 14).

Once the sealing elements with heated plate 13 have been pulled out, the second profiled elements 3b are finally approached as far as placing them in the position of complete insertion, in which their areas to seal 5 are juxtaposed to the areas to seal 5 of the first profiled elements 3a and are pressed one against the other for their coupling (FIG. 15).

In the embodiment shown in FIGS. 11 to 15 the step of heating ends the instant when the second profiled elements 3b are moved away from the sealing elements with heated plate 13 and the latter are moved away from the first profiled elements 3a; the step of coupling, instead, begins the instant when the heated areas to seal 5 come in contact with each other.

Even in the embodiment shown in FIGS. 11 to 15, therefore, during the coupling time the inner panel 2 is already placed in the insertion configuration and the stroke that the profiled elements 3 must travel is decidedly shorter than that the profiled elements 3 shown in FIGS. 3 to 6 must travel.

In all the embodiments shown in FIGS. 3 to 15 the profiled elements 3 comprise at least one seal element 15 associated with at least one of the first longitudinal portion 7 and the second longitudinal portion 8.

In particular, the seal element 15, which consists of a sheath of rubber or other similar material, is associated with the first longitudinal portion 7 along one longitudinal edge of the same.

During the insertion of the inner panel 2 in the longitudinal slots 6, the perimeter sides 4 slide inside the profiled elements 3 and the seal element 15 is such as to allow a sliding by creeping of the same on the surface of the inner panel 2.

To facilitate the insertion of the inner panel 2 in the longitudinal slots 6, especially in the presence of the seal element 15 on the profiled elements 3 but not only, the process according to the invention can conveniently provide for an additional step that consists in stretching apart the first longitudinal portion 7 and the second longitudinal portion 8, i.e. moving them slightly away with respect to one another.

Figure 16:
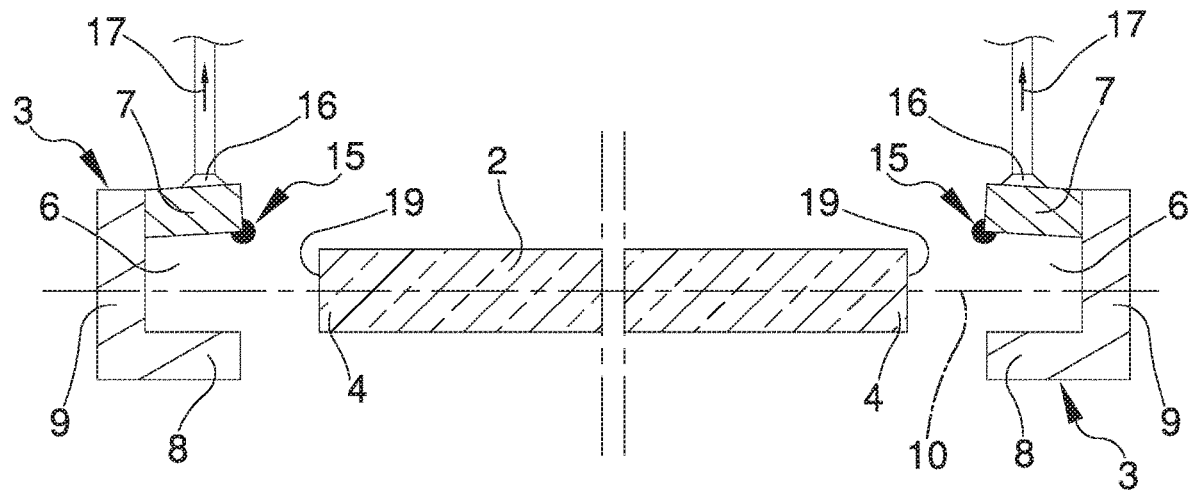
FIGS. 16, 17 and 18 are side, schematic and partial views, that illustrate some variants of the process according to the invention.

The step of stretching apart is performed by means of the application of suction elements 16, such as suction cups or the like, on the surfaces of the first longitudinal portion 7 and/or of the second longitudinal portion 8 external to the longitudinal slot 6, and by means of the application of a force 17 on the suction elements 16 directed in the direction of stretching apart of the first longitudinal portion 7 and of the second longitudinal portion 8 (FIG. 16). Alternatively, the step of stretching apart is performed by means of the introduction of stretching apart elements 18 inside the longitudinal slot 6.

Figure 17:
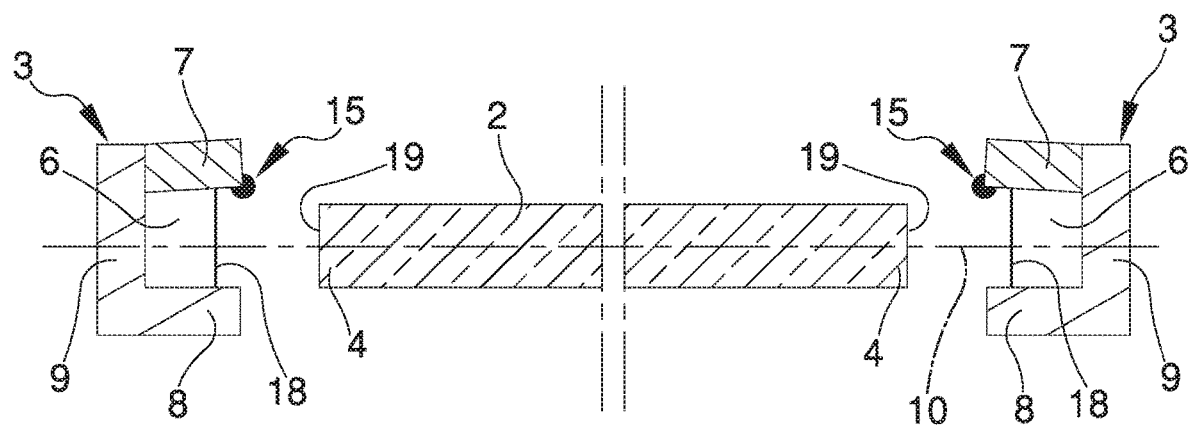

The stretching apart elements 18 are placeable in an active position, in which they push the first longitudinal portion 7 and the second longitudinal portion 8 in a mutual moving away direction (FIG. 17) and, when the inner panel 2 is inserted in the longitudinal slot 6, they are pushed by the perimeter sides 4 in a passive position, in which they stop to stretch apart the first longitudinal portion 7 and the second longitudinal portion 8.

The stretching apart elements 18 are no longer removed from the profiled elements 3 and are intended to remain trapped inside the window/door 1.

Alternatively or in combination to the seal element 15 associated with the profiled elements 3 it is possible to provide a seal element 15 associated with the perimeter sides 4 of the inner panel 2.

Figure 18:
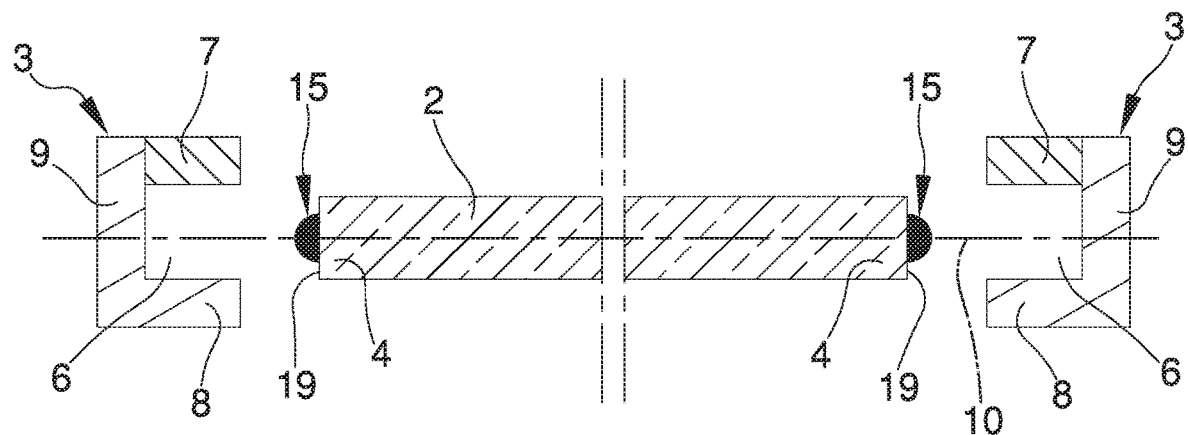

FIG. 18 shows an embodiment in which the seal element 15 is precisely associated with the inner panel 2 along a lateral flank 19 of the perimeter sides 4 intended to face the third longitudinal portion 9 of the profiled elements 3.

The seal element 15, therefore, remains fully enclosed within the longitudinal slots 6 when the profiled elements 3 are sealed together.

Figure 19:
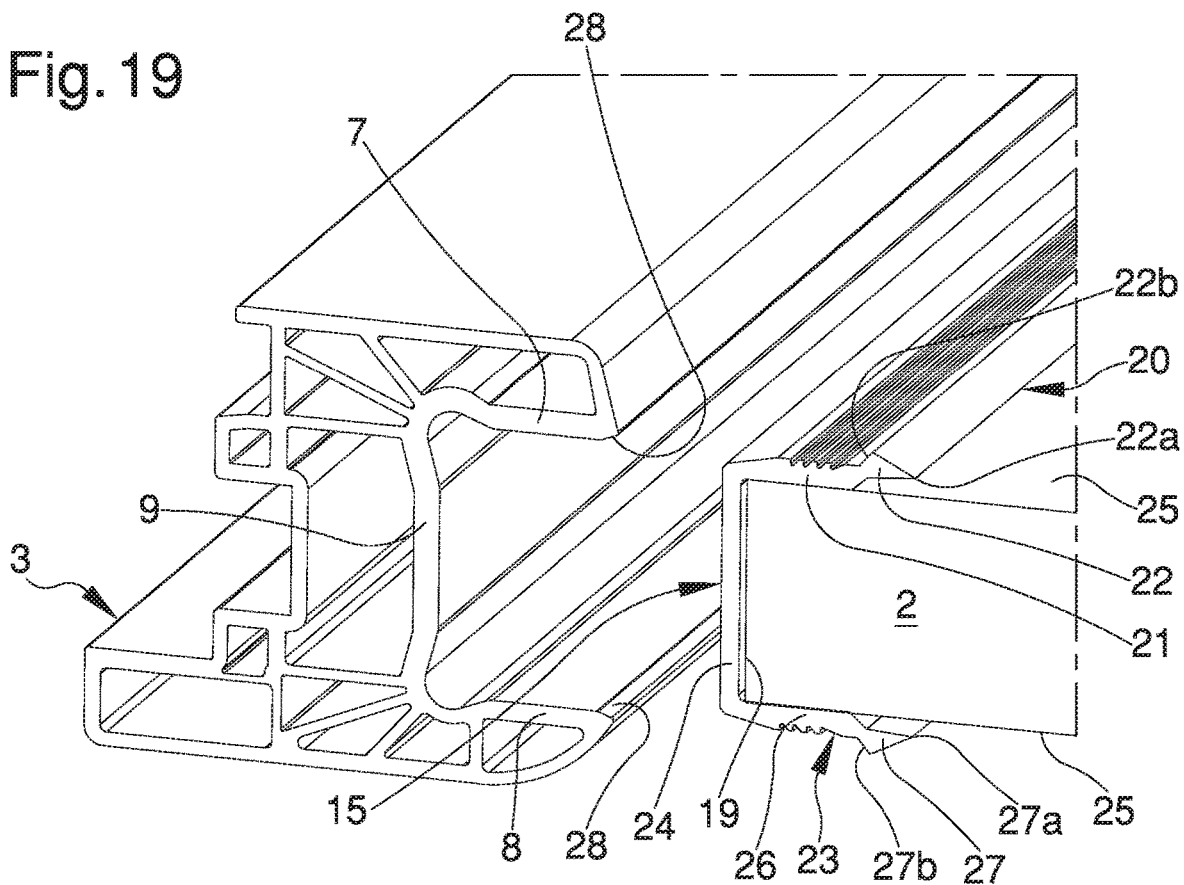
FIGS. 19 and 20 show, in a succession of axonometric, schematic and partial views a further variant of the process according to the invention.
Figure 20:
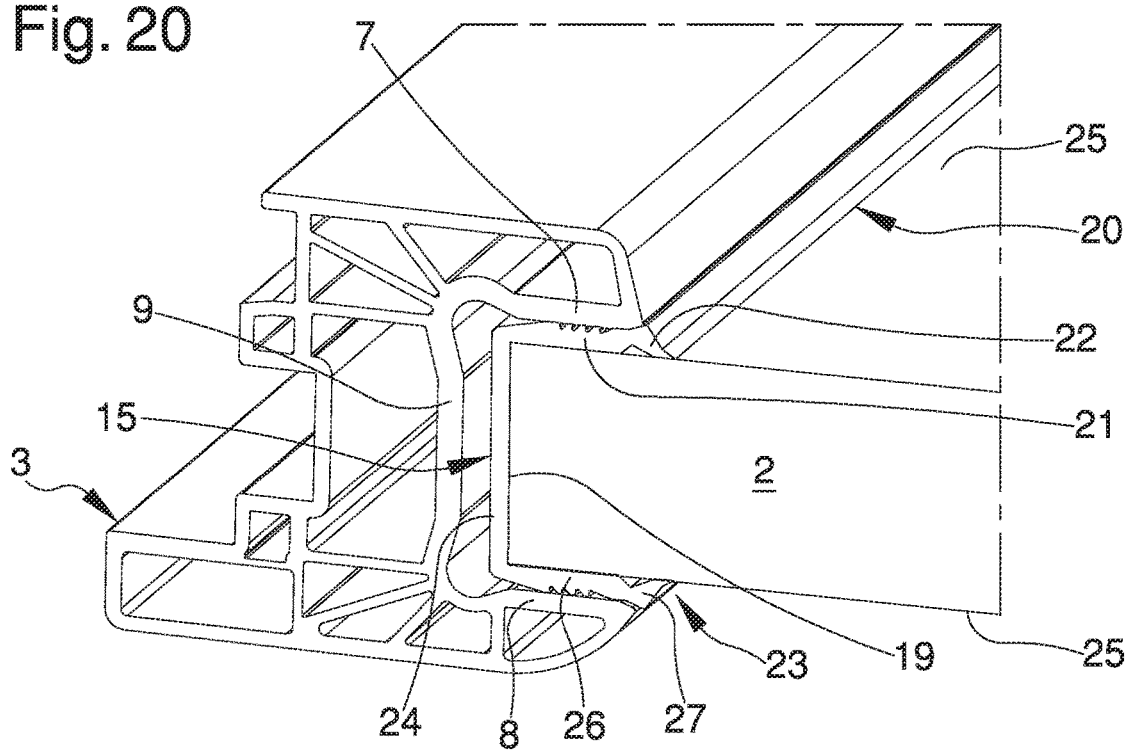

FIGS. 19 and 20 show a further variant of the process according to the invention in which an additional step is provided that consists in interposing at least one special seal element 15 between at least one of the profiled elements 3 and at least one of the perimeter sides 4, in which the seal element 15 is shaped as follows.

The seal element 15 comprises at least a first longitudinal band 20 interposable between the first longitudinal portion 7 and the inner panel 2, in which the first longitudinal band 20 has a cross section divided into:

at least a first base sector 21 adapted to remain attached to the inner panel 2; and at least one first sealing sector 22 protruding with respect to the first base sector 21 and having a first sharp edge 22a and a first actuating edge 22b, the first sealing sector 22 being joined to the first base sector 21 in a movable manner between a rest position, in which the first sharp edge 22a is moved away from the inner panel 2, and an operating position, in which the first sharp edge 22a rests on the inner panel 2, the insertion of the inner panel 2 in the longitudinal slots 6 being adapted to bring the first actuating edge 22b in contact with the first longitudinal portion 7 and to move the first sealing sector 22 from the rest position to the operating position.

Advantageously, the seal element 15 also comprises at least a second longitudinal band 23, interposable between the second longitudinal portion 8 and the inner panel 2, and at least a third longitudinal band 24, interposable between the third longitudinal portion 9 and the inner panel 2.

The first longitudinal band 20, the second longitudinal band 23 and the third longitudinal band 24 are arranged substantially in a C pattern and are intended to be fitted to cover the perimeter sides 4 of the inner panel 2 on three surfaces, namely on a part of the two main faces 25 and on the lateral flank 19 of the inner panel 2.

In particular, the width of the third longitudinal band 24 is substantially equal to the thickness of the inner panel 2, so that the seal element 15 wraps the perimeter sides 4 substantially snugly.

Conveniently, the second longitudinal band 23 is substantially identical to the first longitudinal band 20 and, in fact, has a cross section divided into:
  at least a second base sector 26 adapted to remain attached to the inner panel 2; and
  at least a second sealing sector 27 protruding with respect to the second base sector 26 and having a second sharp edge 27a and a second actuating edge 27b, the second sealing sector 27 being joined to the second base sector 26 in a movable manner between a rest position, in which the second sharp edge is moved away from the inner panel 2, and an operating position, in which the second sharp edge 27a rests on the inner panel 2, the insertion of the inner panel 2 in the longitudinal slots 6 being adapted to bring the second actuating edge 27b in contact with the second longitudinal portion 8 and to move the second sealing sector 27 from the rest position to the operating position.

In practice, the first base sector 21 and the second base sector 26 constitute a fixed portion of the seal element 15 because, once fitted on the main faces 25, they cannot move with respect to the inner panel 2 by virtue of the C shape of the seal element 15.

During the insertion of the inner panel 2 in the longitudinal slots 6, in fact, the first longitudinal portion 7 and the second longitudinal portion 8 slide on the seal element 15 without, however, moving it, considering that this displacement is prevented by the presence of the third longitudinal band 24 that holds together the first longitudinal band 20 and the second longitudinal band 23.

The embodiment of the invention shown in the FIGS. 19 and 20 is therefore very advantageous in that it provides for the mounting of the seal element 15 on the inner panel 2 even without the use of adhesive materials such as glue or the like.

Alternative embodiments of the invention cannot however be ruled out in which the first longitudinal band 20 and the second longitudinal band 23 are joined to the inner panel 2 by gluing, in which case the seal element 15 may also be without the third longitudinal band 24.

Alternative embodiments of the invention cannot however be ruled out in which the seal element 15 is without both the second longitudinal band 23 and the third longitudinal band 24 and only comprises the first longitudinal band 20 glued to the inner panel 2.

The first sealing sector 22 and the second sealing sector 27 constitute a movable portion of the seal element 15 since they move from the rest position to the operating position at the moment when the inner panel 2 is inserted in the longitudinal slots 6.

For this purpose the first actuating edge 22b and the second actuating edge 27b consist of inclined surfaces intended to come in contact with the corresponding activation surfaces 28, also inclined, on the first longitudinal portion 7 and on the second longitudinal portion 8.

With respect to the lying plane 10 identified by the longitudinal slots 6 upon insertion of the inner panel 2, the surfaces which identify the first actuating edge 22b and the second actuating edge 27b are inclined by 20°-40°, preferably 30°, while the activation surfaces 28 are inclined by 10°-30°, preferably 20°.

When the activation surfaces 28 come in contact with the actuating edges 22b, 27b they push the sealing sectors 22, 27 to move from the rest position to the operating position by bringing the sharp edges 22a, 27a resting on the inner panel 2.

This particular solution allows to ensure the seal of the seal element 15 both against liquid and against dust and dirt, which can in no way penetrate under the seal element 15.

For the manufacture of the windows/doors 1 in accordance with the provisions of the previously described process, the present invention also relates to a system 29 intended for this purpose.

The system 29 comprises:
  a base frame 30 for resting on the ground;
  a plurality of sealing machines 31 mounted on the base frame 30 and each having:
    at least one pair of retention members 32 adapted to retain the respective profiled element 3;
    removal means 44 suitable for the mechanical machining by chip removal of at least one of the areas to seal 5;
    heating means 13 for heating the areas to seal 5;
    sliding means 33 of the retention members 32 which are adapted to move the profiled elements 3 between a position of mutual spacing away and a position of mutual approach, in which the heated areas to seal 5 are coupleable to one another by pressing the profiled elements 3 one against the other to maintain the areas to seal 5 in mutual contact and to define a frame for windows/doors 1; and
  at least one support assembly 34 for the support of the inner panel 2, which is associated with the base frame 30 and adapted to place the inner panel 2 in an insertion configuration in which it is substantially coplanar to the lying plane 10 of the longitudinal slots 6, the displacement of the profiled elements 3 from the position of mutual spacing away to the position of mutual approach being adapted to insert at least partly the inner panel 2 in the longitudinal slots 6 to define the window/door 1.

The sealing machines 31 are advantageously of the type of those shown in patent documents WO 2013/132406 A1, WO 2014/122572 A1 and IT 102015000033340.

The system 29 shown in the figures is intended for the manufacture of windows/doors 1 of rectangular shape and is therefore equipped with four sealing machines 31 adapted to seal the profiled elements 3 at the four corners of the window/door 1.

At least one of the sealing machines 31 is mounted on the base frame 30 by interposition of displacement means, the mutual distance of the sealing machines 31 being adjustable depending on the dimensions of the window/door 1.

Conveniently, one of the sealing machines 31 is mounted on the base frame 30 in a fixed position, while the remaining sealing machines 31 are associated with the displacement means and their position is changeable with respect to the fixed sealing machine 31 depending on the dimensions of the window/door 1.

Alternative embodiments cannot however be ruled out in which all the sealing machines 31 are movable.

The lying plane 10 in which the profiled elements 3 are placed is substantially horizontal and the support assembly 34 comprises lifting and lowering means 35, 36, 37 adapted to bring the inner panel 2, already arranged horizontally, to the height of the lying plane 10.

The lifting and lowering means 35, 36, 37 comprise:
at least one framework 35 located above the base frame 30 so as to rise above the sealing machines 31; and
at least one gripping device 36 which is adapted to grasp from above the inner panel 2 and is associated with the framework 35 in a movable manner along at least one vertical direction 43.

The framework 35, for example, is associated with vertical uprights 38 which allow its resting onto the ground.

The gripping device 36, instead, is of the suction type and consists, e.g., in a plurality of suction cups.

Conveniently, the gripping device 36 is associated with a trolley device 39 which is mounted in a sliding manner on the framework 35 and which allows the gripping device itself to be moved not only along the vertical direction 43 but also along two horizontal directions 40, 41 orthogonal to each other, so as to allow the centering of the inner panel 2 with respect to the position of the sealing machines 31.

The trolley device 39 has also the aim of allowing to pick the inner panel 2 from a warehouse 42.

In this regard it is noticed that the system 29 comprises at least one warehouse 42 for housing a plurality of inner panels 2, which is placed on the ground next to the base frame 30 and is also overlooked by the framework 35; this way, by sliding along the framework 35 the gripping device 36 can be moved from the warehouse 42 to the proximity of the base frame 30, and vice versa.

It is easy to understand, therefore, that the support assembly 34 is adapted to move the inner panels 2 from the warehouse 42 to the insertion configuration.

To facilitate the movement of the inner panels 2 in the proximity of the sealing machines 31, the lifting and lowering means 35, 36, 37 can comprise at least one resting base 37 for the inner panel 2 being machined.

In particular, the resting base 37 is substantially located in the proximity of the base frame 30 and is housed in the space delimited by the sealing machines 31, and below the lying plane 10.

The resting base 37 is also liftable and lowerable and can be used to bring the inner panel 2 to the height of the lying plane 10 instead of the gripping device 36.

In other words, the gripping device 36 can be used for:
picking the inner panels 2 from the warehouse 42 and taking them directly to the insertion configuration, keeping them hanging from above; or
picking the inner panels 2 from the warehouse 42 and placing them on the resting base 37, where they remain at a lower height than the height of the lying plane 10 and are lifted only when appropriate.

The operation of the system 29 is easy to understand from the previous description of the process according to the invention that the system itself is capable of implementing.

Figure 23:
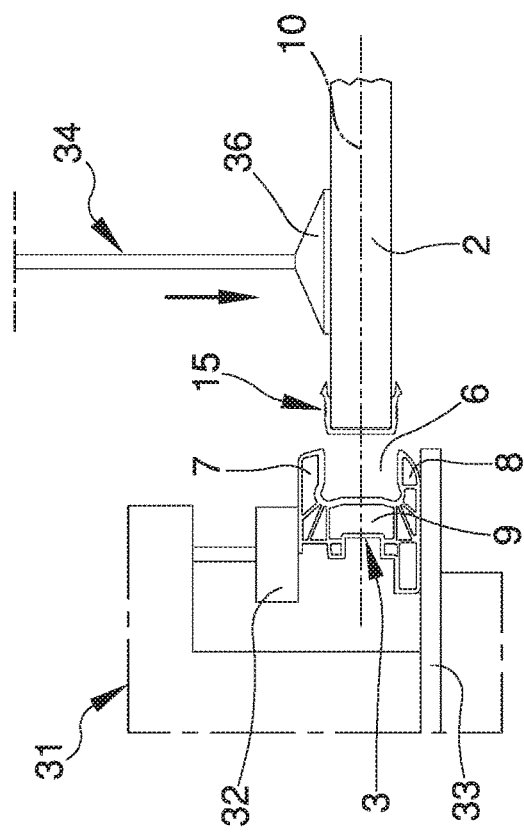
FIGS. 23, 24 and 25 show, in a succession of side views on an enlarged scale, the operation of the system according to the invention.
Figure 25:
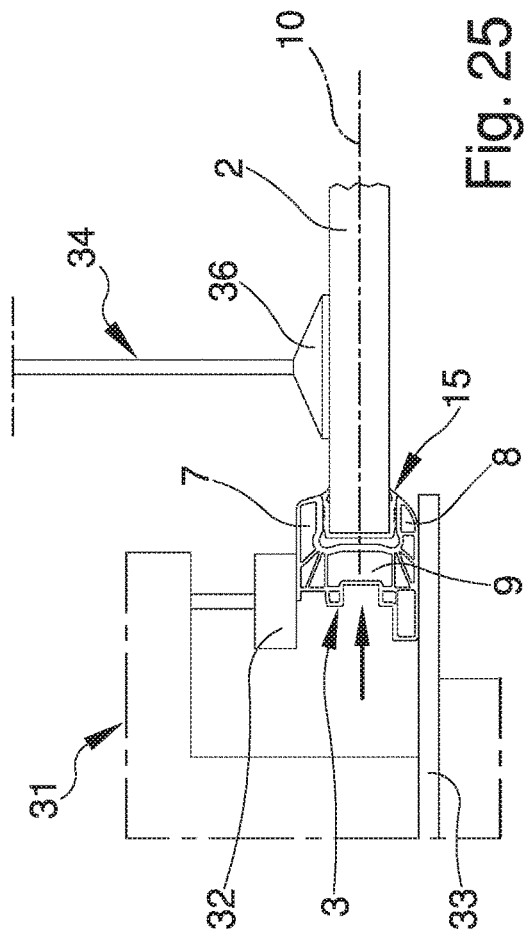
Figure 24:
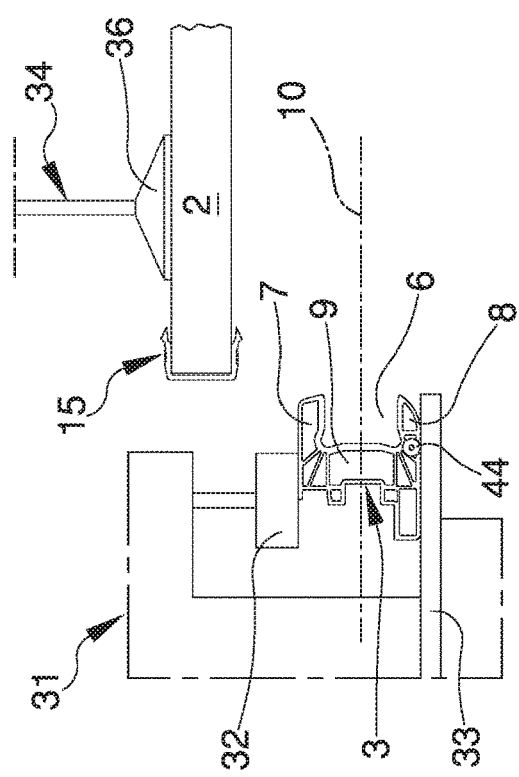

A schematic and simplified version of the operation of the system 29 is shown in FIGS. 23 to 25, in which the same is used to work on the particular type of profiled elements 3, inner panel 2 and seal element 15 shown in FIGS. 19 and 20.

In this case the inner panel 2 reaches the system 29 already fitted with the seal element 15 and, once gripped by the gripping device 36, is brought in the proximity of the sealing machines 31 where the profiled elements 3 have been previously loaded, locked by means of the relative retention members 32 and subjected to the step of mechanical machining by chip removal by means of the removal means 44 (FIG. 23).

The system 29 thus operates automatically to place the inner panel 2 first in the insertion configuration (FIG. 24) and subsequently to move the retention members 32 along the sliding means 33, by approaching the profiled elements 3 to the inner panel 2 and inserting the perimeter sides 4 in the longitudinal slots 6 together with the seal element 15 (FIG. 25). It has in practice been found that the described invention achieves the intended objects.

In this regard it is underlined that the particular solution to provide a process and a system with chip removal means and a support assembly according to the present invention allows to manufacture, in a single work station, ready and finished windows/doors, in which the frame is already sealed around the inner panel and does not need subsequent finishing processes, for the removal of the sealing bead, or "glazing" operations.

The profiled elements are in fact machined on board of the sealing machines by means of the removal means, to obtain the sealing without bead of the profiled elements that is carried out directly along the perimeter of the inner panel.

What is claimed is:

1. A process for the manufacture of windows/doors (1), wherein said process comprises the following steps:
providing at least one inner panel (2) for windows/doors;
providing a plurality of plastic profiled elements (3) for windows/doors, each of said profiled elements (3) comprising at least two areas to seal (5), coupleable to the areas to seal (5) of the other profiled elements (3), and at least one longitudinal slot (6), in which a respective perimeter side (4) of said inner panel (2) is insertable;
wherein said profiled elements (3) comprise at least a first longitudinal portion (7), a second longitudinal portion (8) and a third longitudinal portion (9) mutually arranged substantially in a C pattern, with said first longitudinal portion (7) and said second longitudinal portion (8) which extend from said third longitudinal portion (9) and define said longitudinal slot (6) between them, wherein said longitudinal profiled elements (7, 8, 9) are made separately from each other and assembled later;
performing a step of mechanical machining by chip removal on at least one of said areas to seal (5), which comprises the step of forming a groove (11) at at least one of said areas to seal (5);
heating said areas to seal (5);
coupling said heated areas to seal (5) to one another by pressing said profiled elements (3) one against the other to maintain said areas to seal (5) in mutual contact and define the frame for windows/doors, said coupling taking place with said inner panel (2) inserted in said longitudinal slots (6) to define a window/door (1) which is composed by said frame and by said inner panel (2) contained in said frame said step of coupling the areas to seal (5) comprising a sub-step of melting the areas to seal (5) between them to define a sealing bead and a sub-step of making a containing compartment defined by said groove (11), in which said sealing bead is made inside said containing compartment;

wherein said step of forming a groove (11) is implemented by an operation by chip removal on a peripheral edge of at least one of said profiled elements (3);

wherein said groove (11) is formed only on said second longitudinal portion (8) and on said third longitudinal portion (9), while said first longitudinal portion (7) is completely leveled at the same working depth corresponding to the working depth of said groove (11), said profiled elements (3) being sealed together by melting and mutual union of said second longitudinal portions (8) and of said third longitudinal portions (9), while said first longitudinal portions (7) are not heated and, during said step of coupling, approach substantially snugly without melting.

2. The process according to claim 1, wherein said process comprises the steps of:

placing said inner panel (2) in an insertion configuration in which said inner panel (2) is substantially coplanar to the lying plane (10) of said longitudinal slots (6); and moving said profiled elements (3) from a position of mutual spacing away to a position of mutual approach, said moving being adapted to insert said inner panel (2) in said longitudinal slots (6).

3. The process according to claim 1, wherein said coupling takes place substantially by pressing all said profiled elements (3) at the same time one against the other.

4. The process according to claim 1, wherein said step of heating takes place with said inner panel (2) arranged to the outside of said longitudinal slots (6), between said heating and said coupling elapsing a coupling time of less than 2 seconds during which said inner panel (2) is inserted in said longitudinal slots (6).

5. The process according to claim 1, wherein said heating occurs with said inner panel (2) arranged partially inserted inside at least one of said longitudinal slots (6), between said heating and said coupling elapsing a coupling time of less than 2 seconds during which the profiled element (3) corresponding to said at least one of said longitudinal slots (6) moves from a position of partial insertion to a position of full insertion.

6. The process according to claim 1, wherein said heating takes place with said inner panel (2) arranged completely inserted inside at least one of said longitudinal slots (6), between said heating and said coupling elapsing a coupling time of less than 2 seconds during which the profiled element (3) corresponding to said at least one of said longitudinal slots (6) remains substantially stationary with respect to said inner panel (2).

7. The process according to claim 1, wherein said process comprises the step of stretching apart said first longitudinal portion (7) and said second longitudinal portion (8) to facilitate the insertion of said inner panel (2) in said longitudinal slots (6).

8. The process according to claim 1, wherein said profiled elements (3) comprise at least one seal element (15) associated with at least one of said first longitudinal portion (7) and said second longitudinal portion (8).

9. The process according to claim 1, wherein said inner panel (2) comprises at least a seal element (15) associated with said perimeter sides (4).

10. The process according to claim 1, wherein said process comprises the interposing of at least one seal element (15) between at least one of said profiled elements (3) and at least one of said perimeter sides (4) of the inner panel (2), said seal element (15) comprising at least a first longitudinal band (20) interposable between said first longitudinal portion (7) and said inner panel (2), in which said first longitudinal band (20) has a cross section divided into:

at least a first base sector (21) adapted to remain attached to said inner panel (2); and at least a first sealing sector (22) protruding with respect to said first base sector (21) and having a first sharp edge (22a) and a first actuating edge (22b), said first sealing sector (22) being joined to said first base sector (21) in a movable manner between a rest position, in which said first sharp edge (22a) is moved away from said inner panel (2), and an operating position, in which said first sharp edge (22a) rests on said inner panel (2), the insertion of said inner panel (2) in said longitudinal slots (6) being adapted to bring said first actuating edge (22b) in contact with said first longitudinal portion (7) and to move said first sealing sector (22) from said rest position to said operating position.

11. The process according to claim 10, wherein said seal element (15) comprises at least a second longitudinal band (23) interposable between said second longitudinal portion (8) and said inner panel (2) and at least a third longitudinal band (24) interposable between said third longitudinal portion (9) and said inner panel (2), said first longitudinal band (20), said second longitudinal band (23) and said third longitudinal band (24) being arranged substantially in a C pattern.

12. The process according to claim 11, wherein said second longitudinal band (23) has a cross section divided into:

at least a second base sector (26) adapted to remain attached to said inner panel (2); and at least a second sealing sector (27) protruding with respect to said second base sector (26) and having a second sharp edge (27a) and a second actuating edge (27b), said second sealing sector (27) being joined to said second base sector (26) in a movable manner between a rest position, in which said second sharp edge (27a) is moved away from said inner panel (2), and an operating position, in which said second sharp edge (27a) rests on said inner panel (2), the insertion of said inner panel (2) in said longitudinal slots (6) being adapted to bring said second actuating edge (27b) in contact with said second longitudinal portion (8) and to move said second sealing sector (27) from said rest position to said operating position.

* * * * *